(12) United States Patent
Edwards et al.

(10) Patent No.: US 6,486,781 B2
(45) Date of Patent: Nov. 26, 2002

(54) EQUIPMENT LABEL

(75) Inventors: Geoffrey Stephen Edwards, Grange-Over-Sands (GB); Michael Craig Foster, Ulverston (GB)

(73) Assignee: Oxley Developments Company Limited, Cumbria (GB)

( * ) Notice: Subject to any disclaimer, the term of this patent is extended or adjusted under 35 U.S.C. 154(b) by 13 days.

(21) Appl. No.: 09/852,116

(22) Filed: May 9, 2001

(65) Prior Publication Data

US 2002/0043011 A1 Apr. 18, 2002

(30) Foreign Application Priority Data

May 10, 2000 (GB) ............................................. 0011148

(51) Int. Cl.[7] ............................................. G08B 13/14
(52) U.S. Cl. ................. 340/572.1; 340/572.4; 340/572.7; 340/572.8; 340/572.9; 235/384; 235/492
(58) Field of Search ........................... 340/572.1, 572.4, 340/572.7, 572.8, 572.9; 235/441, 442, 443, 384, 492

(56) References Cited

U.S. PATENT DOCUMENTS

| 3,699,311 | A | * | 10/1972 | Dunbar | 235/61.11 H |
|---|---|---|---|---|---|
| 5,523,618 | A | | 6/1996 | Berney | |
| 5,714,234 | A | * | 2/1998 | Robertson | 428/195 |
| 5,764,138 | A | | 6/1998 | Lowe | |
| 6,107,913 | A | * | 8/2000 | Gatto et al. | 340/572.7 |
| 6,144,301 | A | * | 11/2000 | Frieden | 340/572.8 |
| 6,285,285 | B1 | | 9/2001 | Mongrenier | |

FOREIGN PATENT DOCUMENTS

| DE | 297 06 922 U1 | 7/1997 |
|---|---|---|
| EP | 0 248 928 A1 | 12/1987 |
| FR | 2 717 593 | 9/1995 |
| FR | 2 764 977 | 12/1998 |
| FR | 2 777 378 | 10/1999 |

OTHER PUBLICATIONS

European Search Report dated May 3, 2002 for corresponding European application No. 01304150.4.

* cited by examiner

Primary Examiner—Jeffrey Hofsass
Assistant Examiner—Hung Nguyen
(74) Attorney, Agent, or Firm—Christie, Parker & Hale, LLP

(57) ABSTRACT

An equipment label comprising an identity plate bearing information markings and an electronic tag having electrical contacts. The identity plate is provided with means for attachment to an item of equipment and is adapted to mount the electronic tag such that in use the label can be attached to the item of equipment with the identity plate's markings exposed to be read and the electrical contacts accessible for communication with the tag.

6 Claims, 2 Drawing Sheets

EQUIPMENT LABEL

CROSS-REFERENCE TO RELATED APPLICATION

Figure 1:
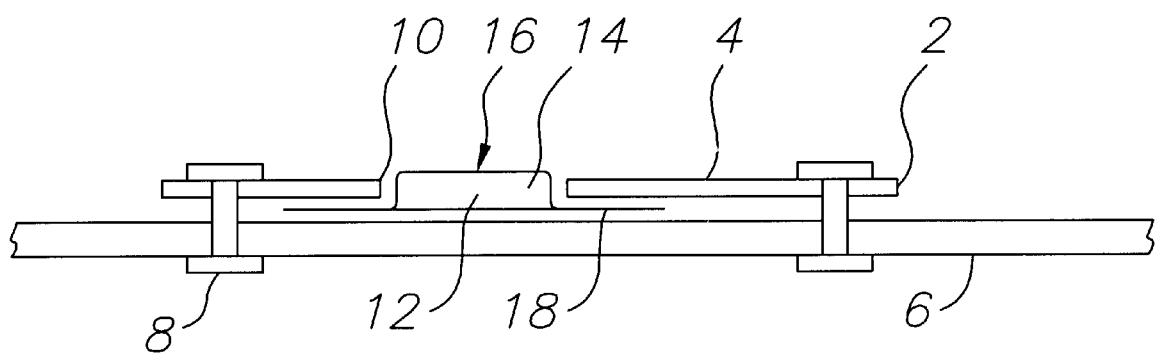

This application claims priority of United Kingdom patent Application No. 0011148.4, filed on May 10, 2000.

The present invention is concerned with labelling of equipment and more specifically with a label utilising an electronic tag.

Electronic equipment used in vital applications such as (but not limited to) military command control communications requires reliable maintenance and updating. The serial number of the equipment and the so called modification number are important to ensure a unique identity and definition of the equipment by being referenced to the complete control drawings and specifications for the equipment. Changes to these documents are then capable of close control so that any changes are fully approved to ensure interchangeability, compatibility and interoperability of the equipment with other systems.

It is known to permanently fix a visible rugged metal identity plate inscribed with the serial and modification numbers to the equipment. Often this information will additionally be in a bar code format to facilitate its reading and recording for asset control.

Electronic data devices, referred to in the art and in the present specification simply as "electronic tags" incorporating non volatile semiconductor memories and associated circuitry are now available which enable the above information to be recorded electronically and read by means of a contact wand which is connected to a desk top computer or other recording device. Such tags may be both readable and writable. The ability to change the electronic data by means of electronic signals transmitted via the contact wand enables variable information such as maintenance actions, environmental exposure etc. to be logged with the identification data. Out of limit electrical parameters and elapsed time may also be logged by providing suitable electrical connection to the equipment, as disclosed in the applicant's patent application.

Hence electronic tags offer significant advantages in their flexibility and in ease of machine reading of data. However the conventional identity plate is advantageous for its robust construction and its compatibility with existing methods of reading, eg. using a bar code reader or of course the naked eye.

An object of the present invention is to provide an equipment label which is both flexible in terms of its storage capacity and compatible with existing methods of reading stored information. It is desired that the label should be robust and capable of straightforward manufacture.

In accordance with a first aspect of the present invention there is an equipment label comprising an identity plate bearing information markings and an electronic tag having electrical contacts, the identity plate being provided with means for attachment to an item of equipment and being adapted to mount the electronic tag such that in use the label can be attached to the item of equipment with the identity plate's markings exposed to be read and the electrical contacts accessible for communication with the tag.

Hence in a simple and robust manner the advantages of both electronic tag and identity plate can be combined.

Preferably the electronic tag has a portion for trapping between the identity plate and the item of equipment to mount the electronic tag, the electronic tag being accessible in use by virtue of an opening in the identity plate. Again this construction can be both simple and robust.

Most preferably the tag has a rear flange for trapping between the identity plate and the item of equipment and a body received in the opening in the identity plate, an uppermost face of the body bearing the electrical contacts.

The means for securing the identity plate to the equipment may simply be formed as through going bores for receipt of rivets or other fastenings.

Figure 2:
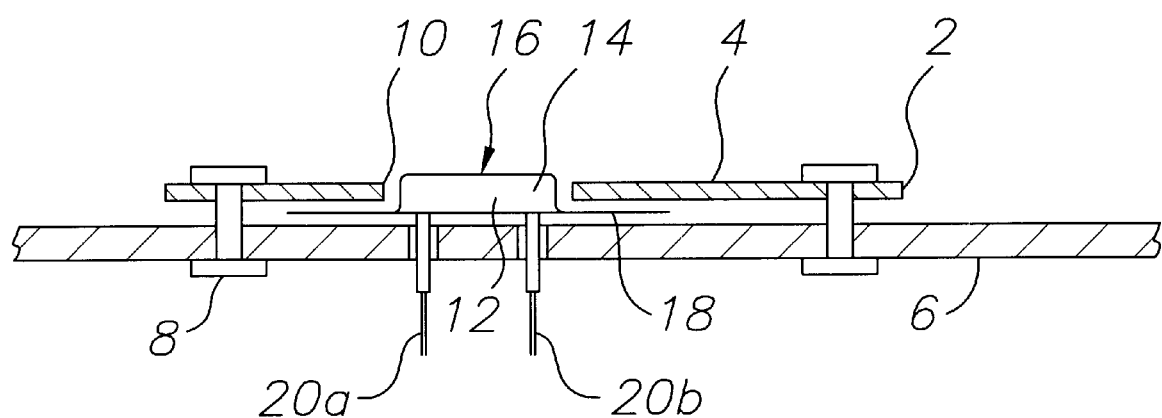

A specific embodiment of the present invention will now be described, by way of example only, with reference to the accompanying drawings in which:

FIG. 1 is a sectional view in a vertical plane of an equipment label embodying the invention; and FIG. 2 is a corresponding view of a second equipment label embodying the invention.

In the drawings an identity plate 2 is formed of metal and is inscribed on its outermost face 4 with information relating to an item of equipment part of whose chassis is seen at 6. The identity plate 2 has means for attachment to the chassis 6, formed in this embodiment simply as openings for receipt of rivets 8 passed through both the identity plate 2 and the chassis 6. A larger opening 10 is also provided through the identity plate.

The other major component of the label is an electronic tag 12. In the illustrated embodiments this has a shallow body 14 which projects through the opening 10 so that its uppermost surface 16 is exposed. Electrical contacts are provided on this uppermost surface through which the tag can be read and written to. A lower portion of the electronic tag 12 has a peripheral flange 18 which, being trapped between the chassis 6 and the identity plate 2, retains the electronic tag 12 securely in position.

FIG. 2 illustrates a further equipment label embodying the present invention. The illustrated components of the label correspond to those shown in FIG. 1, except that a pair of insulated terminals 20a, 20b extend from the underside of the tag 12 and project through respective holes 22a, 22b in the equipment chassis 6 for connection to internal circuitry of the host electronic equipment (not shown) which is to be labelled and which is contained within/on the chassis 6. By virtue of its connection to the host electronic equipment, the electronic tag 12 can monitor functioning of the equipment. In particular, the FIG. 2 embodiment has an electronic tag which maintains a record of elapsed host operating time and/or of host activations. This can assist in ensuring servicing etc. at appropriate intervals.

Hence in use there is no risk of losing the identity of the equipment and its maintenance record is securely attached and conveniently located for reading/writing with the contact wand.

What is claimed is:

1. An equipment label comprising an identity plate bearing information markings and an electronic tag having electrical contacts, the identity plate being provided with means for attachment to an item of equipment and being adapted to mount the electronic tag such that in use the label can be attached to the item of equipment with the markings of the identity plate exposed to be read and the electrical contacts accessible for communication with the tag.

2. An equipment label according to claim 1, wherein the electronic tag has a portion for trapping between the identity plate and the item of equipment to mount the electronic tag, and the identity plate has an opening by which the electronic tag is accessible in use.

3. An equipment label according to claim 2, wherein the tag has a rear flange for trapping between the identity plate and the item of equipment and a body received in the opening in the identity plate, an uppermost face of the body bearing the electrical contacts.

4. An equipment label according to claim 1, wherein said means for securing the identity plate to the equipment comprises through-going bores for receipt of respective fastenings.

5. An equipment label according to claim 1, wherein the electronic tag includes insulated terminals extending from the underside of the electronic tag for projecting, in use, through respective holes in said item of equipment for connection to internal circuitry of that equipment which is to be labelled, whereby the tag can monitor functioning of the equipment.

6. An equipment label according to claim 5, wherein by way of information received via said terminals, the tag is adapted to maintain a record of any of elapsed operating time and activations of said item of equipment.

* * * * *